United States Patent [19]
Agarwal et al.

[11] Patent Number: 5,680,338
[45] Date of Patent: Oct. 21, 1997

[54] METHOD AND SYSTEM FOR VECTOR PROCESSING UTILIZING SELECTED VECTOR ELEMENTS

[75] Inventors: Ramesh Chandra Agarwal, Yorktown Heights, N.Y.; Randall Dean Groves, Austin, Tex.; Fred G. Gustavson, Briarcliff, N.Y.; Mark A. Johnson, Austin; Brett Olsson, Round Rock, both of Tex.; James B. Shearer, Ossining, N.Y.

[73] Assignee: International Business Machines Corporation, Armonk, N.Y.

[21] Appl. No.: 368,172

[22] Filed: Jan. 4, 1995

[51] Int. Cl.$^6$ .................................................. G06F 17/16
[52] U.S. Cl. ........................................................ 364/736
[58] Field of Search ............................ 364/736; 395/800

[56] References Cited

U.S. PATENT DOCUMENTS

| | | | |
|---|---|---|---|
| 4,594,682 | 6/1986 | Drimak | 364/900 |
| 4,685,076 | 8/1987 | Yoshida | 364/736 |
| 4,722,049 | 1/1988 | Lahti | 364/200 |
| 4,760,545 | 7/1988 | Inagami et al. | 364/736 |
| 4,858,115 | 8/1989 | Rusterholz et al. | 364/200 |
| 4,873,630 | 10/1989 | Rusterholz et al. | 364/200 |
| 4,881,168 | 11/1989 | Inagami et al. | 364/200 |
| 4,888,679 | 12/1989 | Fossum et al. | 364/200 |
| 4,888,682 | 12/1989 | Ngai et al. | 395/800 |
| 4,926,317 | 5/1990 | Wallach et al. | 364/200 |
| 4,958,274 | 9/1990 | Dutton et al. | 364/200 |
| 5,019,969 | 5/1991 | Izumisawa et al. | 364/736 |
| 5,032,985 | 7/1991 | Curran et al. | 364/200 |
| 5,091,848 | 2/1992 | Kojima | 395/800 |
| 5,111,389 | 5/1992 | McAuliffe et al. | 395/800 |
| 5,133,059 | 7/1992 | Ziegler et al. | 395/425 |
| 5,133,061 | 7/1992 | Melton et al. | 395/425 |
| 5,134,697 | 7/1992 | Scheffler | 395/425 |
| 5,148,536 | 9/1992 | Witek et al. | 395/425 |
| 5,179,674 | 1/1993 | Williams et al. | 395/400 |
| 5,206,822 | 4/1993 | Taylor | 364/736 |
| 5,237,685 | 8/1993 | Toney | 395/650 |
| 5,265,237 | 11/1993 | Tobias et al. | 395/500 |
| 5,513,366 | 4/1996 | Agarwal et al. | 395/800 |

*Primary Examiner*—David H. Malzahn
*Attorney, Agent, or Firm*—Mark E. McBurney; Brian F. Russell; Andrew J. Dillon

[57] ABSTRACT

In a vector processing system for processing vector calculations utilizing a portion of a vector comprising a plurality of elements, means for receiving a vector and a vector processing command are provided. The vector processing system also includes means for receiving and storing a start-element value and an end-element value. An arithmetic logic unit is coupled to the means for receiving the vector, the means for receiving the vector processing command, and the means for receiving the start-element and end-element values. The arithmetic logic unit also includes means for executing the vector processing command utilizing only one or more of the elements in the vector, which are selected by the start-element value and the end-element value.

10 Claims, 5 Drawing Sheets

METHOD AND SYSTEM FOR VECTOR PROCESSING UTILIZING SELECTED VECTOR ELEMENTS

CROSS-REFERENCE TO RELATED APPLICATIONS

The present application is related to the following copending applications:

Application Ser. No. 08/313,970, entitled "Method and System For Performing SIMD-Parallel Operations In A Superscalar Data Processing System," Attorney Docket No. AT9-94-045, filed Sep. 28, 1994;

Application Ser. No. 08/313,971, entitled "Method and System For Dynamically Reconfiguring A Register File In A Vector Processor," Attorney Docket No. AT9-94-046, filed Sep. 28, 1994;

Application Ser. No. 08/368,171, entitled "Method and System For Addressing Registers In a Data Processing Unit in an Indexed Addressing Mode," Attorney Docket No. AT9-94-094, filed Jan. 4, 1995;

Application Ser. No. 08/368,173, entitled "Method And System In A Data Processing System for Loading And Storing Vectors In A Plurality Of Modes," Attorney Docket No. AT9-94-073, filed Jan. 4, 1995; and Application Ser. No. 08/368,176, entitled "Method And System For Addressing Registers In A Data Processing Unit In An indirect Addressing Mode," Attorney Docket No. AT9-94-165, filed Jan. 4, 1995;

all of which are assigned to the assignee herein, and incorporated herein by reference thereto.

BACKGROUND OF THE INVENTION

1. Technical Field

The present invention relates in general to an improved data processing system and in particular to an improved central processing unit architecture having vector processing capability. Still more particularly, the present invention relates to an improved SIMD processor for efficiently performing matrix computations utilizing triangular matrices.

2. Description of the Related Art

A large proportion of the scientific calculations performed on computers involves matrices. Partly, this is because of the ubiquity of matrices in the mathematics of scientific problems, but is also partly due to the fact that the use of matrices, and vectors, is ideally suited to the iterative type of calculation in which computers realize their full power.

A matrix may be defined as a rectangular array of elements, each of which will generally be a real or complex number. An m×n matrix is comprised of m rows of elements and n columns of elements. The elements which comprise a column may be referred to as a vector.

Elements of a matrix A may be denoted by $a_{ij}$, where $i=1, \ldots, m$, and $j=1 \ldots, n$. Of the various classes of square matrices, the upper or lower triangular matrix is of special interest in matrix computations. An upper (lower) triangular matrix is one such that $a_{ij}=0$, where $i>j$ ($i<j$). Such triangular matrices are utilized to solve a system of n simultaneous linear differential equations of first order with constant coefficients. The triangular matrix is useful because the eigenvalues of a triangular matrix are its diagonal elements.

In the prior art, the IBM ESA/390 Vector Facility—as do some other vector architectures—supports setting a vector length which permits the processor to begin processing vector elements at the first element and stop processing at the element specified by the "vector length" value. The ESA/390 vector architecture may also handle an interrupt in the middle of a vector calculation, and later resume the vector calculation at the point where the interrupt was received. By configuring the hardware as if an interrupt had occurred the ESA/390 may be set to begin processing vector elements in the middle of a vector; and by setting a vector length value, the ESA/390 may be set to stop processing before the last element. This method of selecting elements for a vector calculation is quite cumbersome and may require several programming steps. This process is described in a publication published by IBM entitled "Enterprise Systems Architecture/390: Vector Operations" (SA22-7207-00).

Thus, a frequent problem in vector processing is updating one or more vectors which are part of an upper or lower triangular matrix. In updating such vectors, only a portion of the vector (i.e., selected elements of the vector) may be needed as part of the vector calculation that produces the desired result. Those persons skilled in the art should recognize that additional efficiency may be obtained by operating on a portion of a vector when performing such vector calculations. Therefore, the problem remaining in the prior art is to provide a method and apparatus for efficiently performing vector operations on selected elements of vectors, where such vectors may be part of a triangular matrix.

SUMMARY OF THE INVENTION

It is therefore one object of the present invention to provide an improved data processing system.

It is another object of the present invention to provide an improved data central processing unit architecture having vector processing capability.

It is yet another object of the present invention to provide an improved SIMD processor for efficiently performing matrix computations utilizing selected elements in a vector comprising a plurality of elements.

The foregoing objects are achieved as is now described. In a vector processing system for processing vector calculations utilizing a portion of a vector comprising a plurality of elements, means for receiving a vector and a vector processing command are provided. The vector processing system also includes means for receiving and storing a start-element value and an end-element value. An arithmetic logic unit is coupled to the means for receiving the vector, the means for receiving the vector processing command, and the means for receiving the start-element and end-element values. The arithmetic logic unit also includes means for executing the vector processing command utilizing only one or more of the elements in the vector which are selected by the start-element value and the end-element value.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
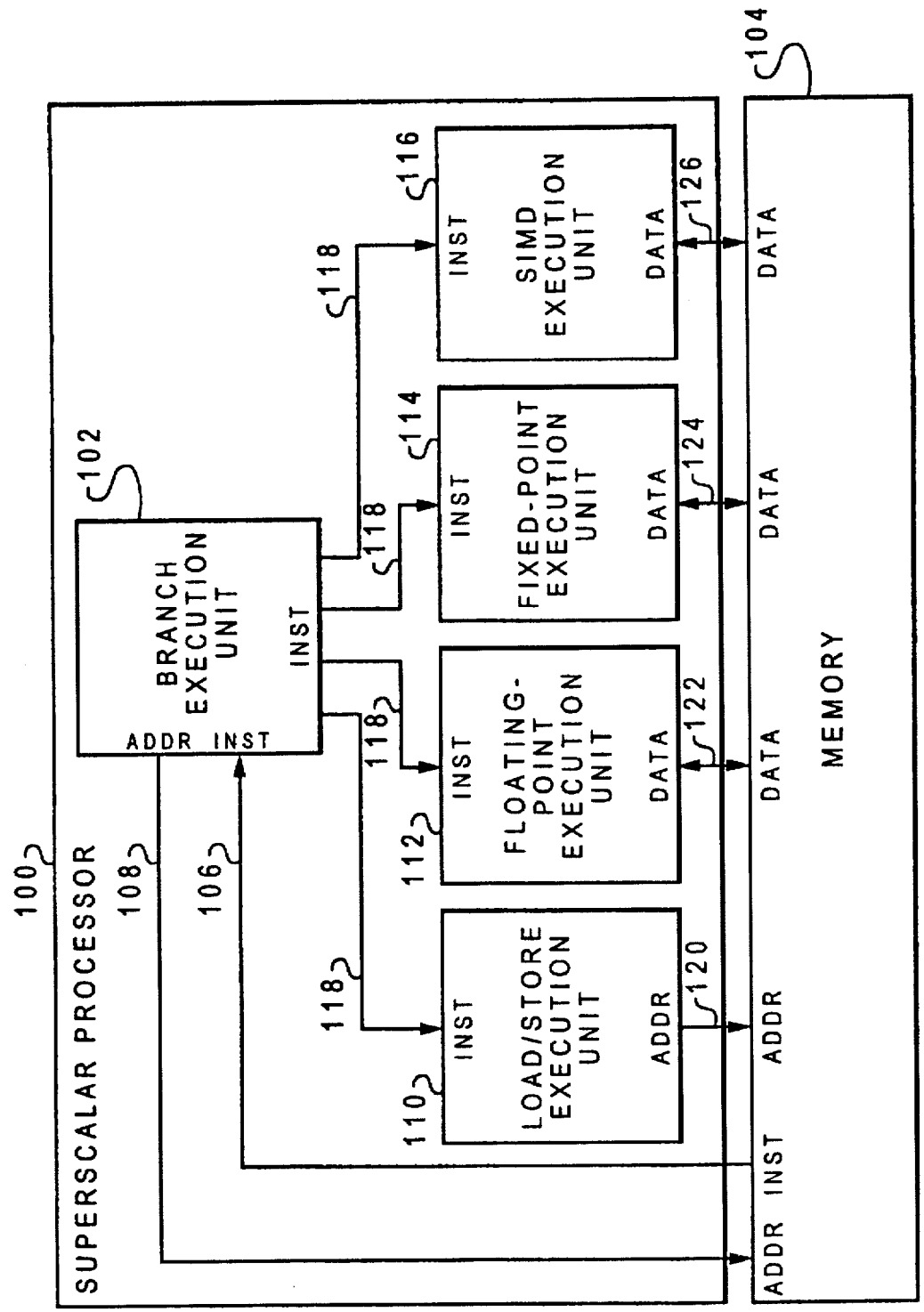
FIG. 1 depicts a high-level block diagram of a superscalar data processing system having an SIMD execution unit in accordance with a preferred embodiment of the present invention.

With reference now to the figures and in particular with reference to FIG. 1, there is depicted a high-level block diagram of a superscalar data processing system having an SIMD execution unit in accordance with a preferred embodiment of the method and system of the present invention. As illustrated, superscalar data processing system 100 includes branch execution unit 102, which is coupled to memory 104 via instruction bus 106 and address bus 108. Branch execution unit 102 fetches instructions from memory 104 and dispatches such instructions to execution units 110–116 via instruction dispatch buses 118. Instruction dispatch buses may be implemented with a few buses shared by all execution units in superscalar data processing system 100, or multiple, dedicated buses for each execution unit.

Memory 104 may be implemented in different hierarchical levels of memory having different speeds and capacities. Such levels of memory may be structured such that from the viewpoint of any particular level in the hierarchy, the next lowest level is considered to be a cache. A cache memory is an auxiliary memory that provides a buffering capability by which a relatively slow and large main memory can interface to an execution unit such as branch execution unit 102 (or to a next higher level of memory) at the cycle time of such an execution unit.

In the example illustrated in FIG. 1, execution unit 116 is an SIMD execution unit, or a "vector processor" execution unit. Thus, within superscalar data processing system 100, branch execution unit 102 interfaces with SIMD execution unit 116 as another "execution class" among the variety of classes of execution units present in superscalar data processing system 100.

Other execution units within superscalar data processing system 100 may include: load/store execution unit 110, floating-point execution unit 112, and fixed-point execution unit 114. Load/store execution unit 110, which is coupled to memory 104 via bus 120, may be utilized to calculate addresses and provide such addresses to memory 104 during the execution of instructions that require memory access. Load/store execution unit 110 may be utilized to provide an address to memory 104 during the execution of instructions in other execution units.

Floating-point execution unit 112, which is coupled to memory 104 via bus 122, may be utilized to perform floating-point arithmetic operations. Fixed-point execution unit 114 is coupled to memory 104 via bus 124. SIMD execution unit 116 is coupled to memory 104 via bus 126, which is discussed in greater detail below.

Figure 2:
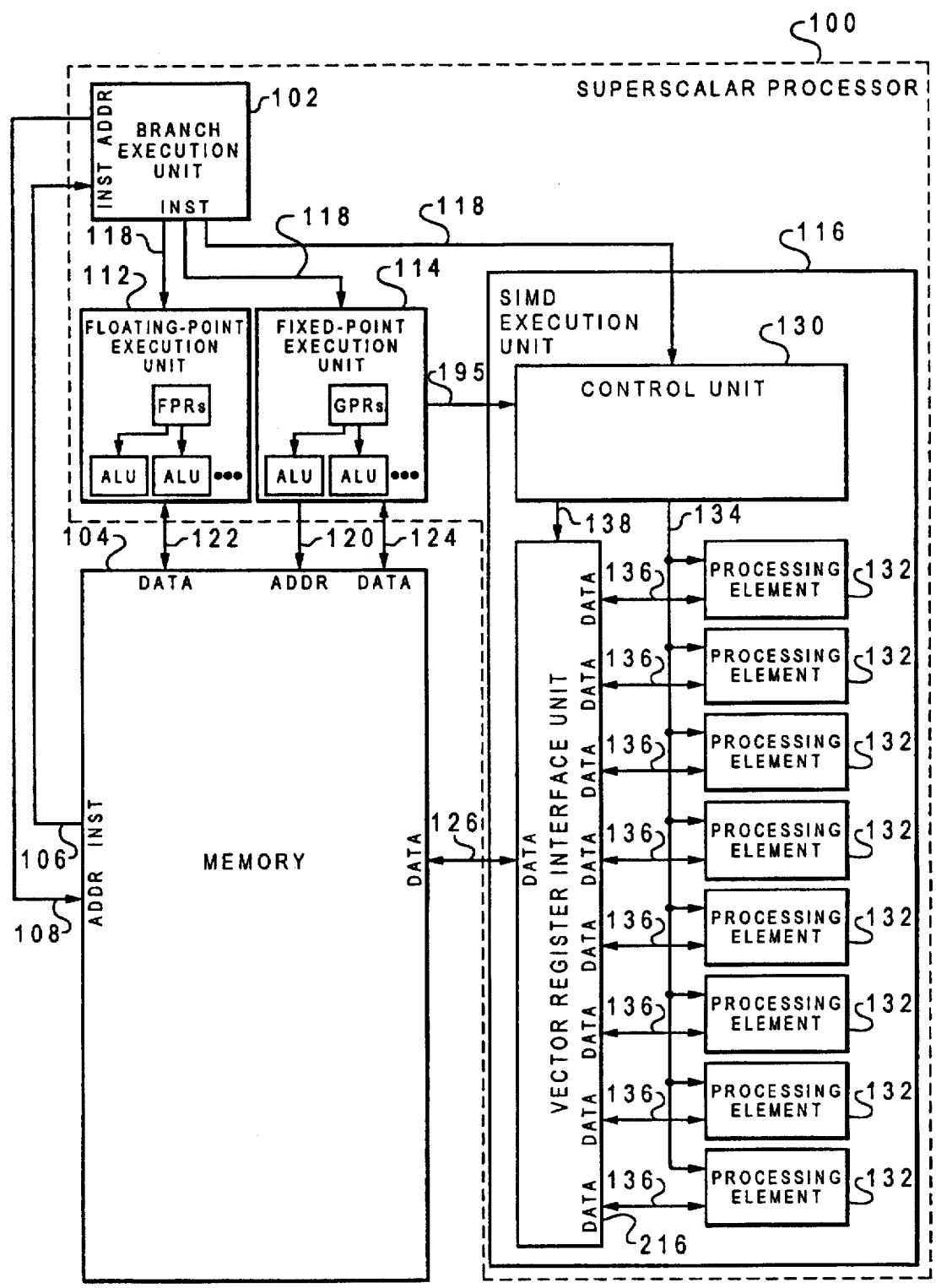
FIG. 2 is a high-level block diagram which further illustrates the components within the SIMD execution unit in accordance with the method and system of the present invention.

With reference now to FIG. 2, there is depicted a high-level block diagram which generally illustrates the components within superscalar data processing system 100 (see FIG. 1), and more specifically illustrates components within SIMD execution unit 116 and the interface between SIMD execution unit 116 and other components in superscalar data processing system 100 in accordance with the method and system of the present invention. As illustrated, superscalar data processing system 100 includes branch execution unit 102, floating-point execution unit 112, fixed-point execution unit 114, and SIMD execution unit 116. In this example, fixed-point execution unit 114 performs the role of load/store execution unit 110, which is illustrated in FIG. 1.

Branch execution unit 102 provides address signals to memory 104 via address bus 108, and receives instructions from memory 104 via instruction bus 106. Such received instructions are then dispatched to selected execution units—including floating-point execution unit 112, fixed-point execution unit 114, and SIMD execution unit 116,—via instruction buses 118. Branch execution unit 102 dispatches instructions to an execution unit that is designated to perform the type of operation represented by the dispatched instruction. For example, an instruction representing a floating-point arithmetic operation is dispatched by branch execution unit 102 to floating-point execution unit 112.

Floating-point execution unit 112 may include a plurality of arithmetic logic units (ALUs) coupled to a group of "floating-point registers" (FPRs). Floating-point execution unit 112 is coupled to memory 104 via data bus 122. Similarly, fixed-point execution unit 114 may include a plurality of arithmetic logic units coupled to a group of "general purpose registers" (GPRs), and may be coupled to memory 104 via address bus 120 and data bus 124. Fixed-point execution unit 114 may calculate and provide addresses for all data memory accesses, thereby performing the role of load/store execution unit 110, which is illustrated in FIG. 1.

In the embodiment illustrated, SIMD execution unit 116 includes control unit 130, vector register interface unit 216, and a plurality of processing elements 132. Control unit 130 provides controls for processing elements 132 by dispatching processing element commands to selected processing elements 132 via command bus 134. Control unit 130 also provides control signals via bus 138 to vector register interface unit 216, where such control signals control the transfer of data between memory 104 and selected processing elements 132. Memory 104 is coupled to vector register interface unit 216 via data bus 126. Vector register interface unit 216 is also coupled to every processing element 132 with plurality of separate data buses 136.

In a preferred embodiment, control unit 130 includes three main functional units: (1) an instruction assembly unit, (2) an instruction expansion unit, and (3) a command dispatch unit. The instruction assembly subunit within control unit 130 provides the instruction and control interface with other execution units within superscalar data processing system 100 by receiving, buffering, and pipelining vector instructions dispatched from branch execution unit 102. Control unit 130 also receives and buffers storage access control information from fixed-point execution unit 114 transmitted on interface bus 195. Such storage access control information may include addresses calculated by fixed-point execution unit 114 and vector length information which may be used by fixed-point execution unit 114 to determine the size of a memory access.

Control unit 130 holds dispatched instructions and associated control information until branch execution unit 102 commits the instruction to complete execution. After branch execution unit 102 commits an SIMD execution unit to complete, no previously dispatched instruction can cause the SIMD execution unit instruction to abort.

An instruction queue within control unit 130 stores dispatched instructions awaiting execution. If the instruction queue is nearly full, control unit 130 notifies branch execution unit 102 that the SIMD execution unit 116 is unable to accept additional instructions. Instructions are released from the instruction queue for execution after receiving a completion signal from branch execution unit 102. Such a completion signal commits the instruction to complete. Branch execution unit 102 commits an instruction to complete after evaluating data, address, and control flow hazards that may occur because of out-of-order execution of instructions in other execution units.

The instruction expansion unit within the instruction control unit translates SIMD execution unit instructions into commands which may be dispatched to selected processing elements 132 and executed simultaneously within such selected processing elements 132 to carry out the SIMD execution unit instruction. When the instruction expansion subunit dispatches commands to several selected processing elements 132, such selected processing elements may be coordinated to provide portions of a vector which is the result of a vector calculation. For example, if a vector contains sixteen elements, eight processing elements 132 may each be utilized to execute two commands utilizing two elements as operands to produce a full sixteen-element vector result. Thus, two sets of commands are dispatched from the instruction expansion subunit to coordinate eight processing elements in operating on two elements each to produce the full sixteen-element vector result.

The command dispatch unit within the instruction control unit dispatches subsection commands (which includes processing element commands) as dispatch conditions are met. Such dispatched conditions include the detection that no register dependency collisions have occurred and the condition that all processing elements are ready to receive commands (i.e., input queues are not full). The command dispatch logic enables out-of-order execution of processing element commands generated by the instruction expansion unit. Such out-of-order execution allows parallel execution of loads or stores with execution of arithmetic operations.

In a vector load operation, when fixed-point execution unit 114 sends a sequence of requests for data to memory 104 on behalf of SIMD execution unit 116, the data requested may not be returned to SIMD execution unit 116 in the order in which the data was requested. For example, if requested data resides in cache memory (part of the hierarchical structure of memory 104), memory 104 may respond within a short period of time by sending the requested data to SIMD execution unit 116. However, if requested data is not located in the relatively fast cache memory, such requested data may be retrieved from a memory location having a relatively high latency compared with the latency of cache. This means that memory 104 sends some requested data to SIMD execution unit 116 sooner than other data.

While SIMD execution unit 116 is waiting for data from a slower memory location, other subsequently requested data may be sent to SIMD execution unit 116 before earlier requested data. To keep track of what data is received by SIMD execution unit 116 as a result of a particular memory request, memory requests are assigned an identifier, which is then later associated with the requested data recalled from memory 104. Such an identifier is then transferred with the requested data to SIMD execution unit 116. Control unit 130 tracks outstanding memory accesses utilizing these assigned identifiers. When all outstanding memory requests have been honored (i.e., data has been received for each outstanding identifier), control unit 130 initiates the transfer of the received data to the processing elements depending on the type of load instruction that was utilized to request the data.

Figure 3:
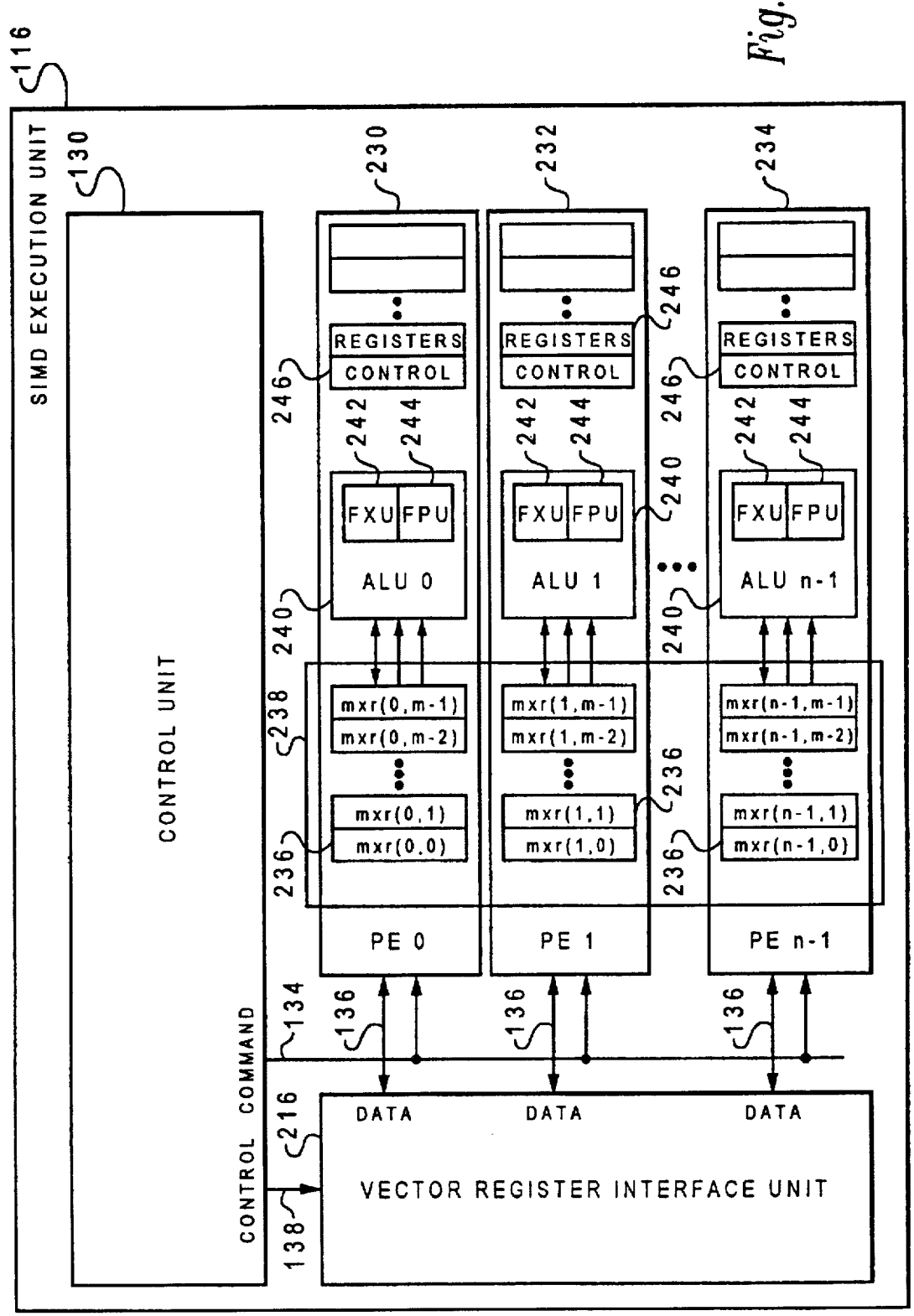
FIG. 3 depicts a more detailed block diagram of processing elements in accordance with the method and system of the present invention.

With reference now to FIG. 3, there is depicted a more detailed representation of processing elements 132 (see FIG. 2) in accordance with the method and system of the present invention. As illustrated, a plurality of processing elements 230–234 (same as processing elements 132 in FIG. 2) are coupled to control unit 130 via common command bus 134 and individual data buses 136 coupled to each processing element 230–234.

In one embodiment of the present invention, processing elements 230–234 each include a register file 236, which may include 512 64-bit registers. Each register may be utilized to store an element in a vector and be used by an arithmetic logic unit (discussed below) to perform various operations. Together, register files 236 associated with each processing element 230–234 form a register array 238 having n sequentially numbered rows of registers and m sequentially numbered columns of registers. Thus, if register files 236 each include 512 registers, and SIMD execution unit 116 contains eight processing elements 230–234, register array 238 includes eight rows of registers and 512 columns of registers.

Vector registers, comprising a plurality of elements, are formed in the columns of register array 238. Additionally, a single vector register may be comprised of registers in more than one column, thereby permitting vector registers having a number of elements larger than n elements.

Each processing element 230–234 may also include an arithmetic logic unit 240. Such an arithmetic logic unit 240 may include both a fixed-point execution unit 242 and a floating-point execution unit 244. Preferably, both fixed- and floating-point execution units have a design similar to fixed-point execution unit 114 and floating-point execution unit 112 in superscalar processor 100 of FIG. 1. By using similar designs, the expense of designing and testing new fixed- and floating-point execution units may be saved. Arithmetic logic unit 240 utilizes operands stored in register file 236 and stores results of operations back into register file 236. Thus, an instruction word intended for execution by arithmetic logic unit 240 may include fields containing data that specifies registers to be utilized for source operands and a register for storing the result of such instruction execution.

Also included within processing elements 230–234 are control registers 246. Some control registers 246 may contain status information reflecting the condition of similar registers in control unit 130. Other control registers 246 may be used during operations that require indexed or indirect addressing of registers in register file 236. An example of control registers 246 includes indirect registers, which are discussed below with reference to FIG. 5.

Figure 4:
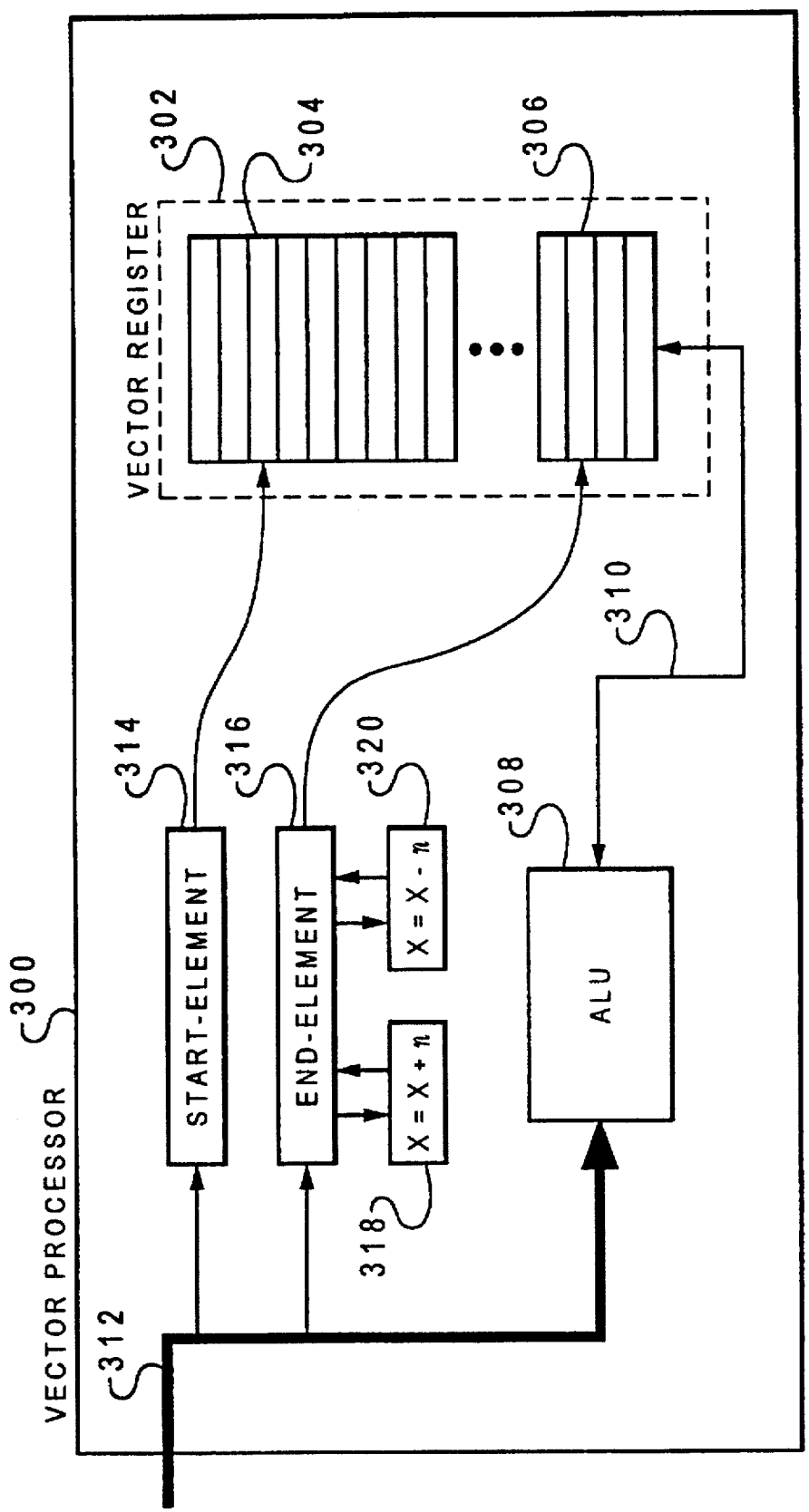
FIG. 4 is a high-level block diagram which illustrates the major components in a vector processor in accordance with the method and system of the present invention.

With reference now to FIG. 4, there is depicted a high-level block diagram illustrating the components and data flow of a preferred embodiment of the present invention. As illustrated, vector processor 300 includes at least one vector register 302, which may be comprised of several registers, such as registers 304 and 306. Registers 304 and 306 may be utilized to store elements comprising a vector. Vector register 302 is a simplified illustration of a vector register which may be formed in register array 238 (see FIG. 3).

Also included in vector processor 300 is arithmetic logic unit (ALU) 308. As illustrated ALU 308 is coupled to vector register 302 via data path 310. Thus, ALU 308 may utilize registers within vector register 302 to perform vector calculations, which are specified by vector instructions received via data path 312.

Data path 312 may be coupled to other portions of a data processing system that provide vector processor 300 with data and instructions. For example, data path 312 may be coupled to a branch execution unit, or a fixed-point execution unit which are located in other portions of a superscalar data processing system, as illustrated in FIG. 2.

Data path 312 may also carry data being transferred to start-element register 314 and end-element register 316. Start-element register 314 and end-element 316 are utilized to store a start-element value and an end-element value, respectively. Start- and end-element values point to registers within vector register 302. For example, in FIG. 4, the start-element value stored in start-element register 314 points to register 304, and the end-element value stored in end-element register 316 points to register 306. According to an important aspect of the present invention, ALU 308 utilizes start-element register 314, and end-element register 316 to select elements in vector register 302 for processing according to instructions received from data path 312.

Also shown within vector processor 300 are incrementer 318 and decrementer 320. Incrementer 318 and decrementer 320 are utilized to increment or decrement values stored in start-element register 314 and end-element register 316. Incrementer 318 and decrementer 320 may be implemented using the adder in fixed-point execution unit 114 (see FIG. 2), where the newly computed values may be transferred via interface bus 312, or, as illustrated, dedicated incrementer and decrementer circuits may be implemented adjacent to, and attached directly to, start-element register 314 and end-element register 316. Both incrementer 318 and decrementer 320 may modify values stored in registers 314 and 316 by a specified value, n.

Incrementer 318 and decrementer 320 may be invoked by an instruction received from data path 312, or as part of the execution of a vector operation. Thus, in an application that is processing vectors in a triangular matrix, the start- or end-element value may be incremented or decremented after ALU 308 processes a first vector and before ALU 308 processes a second adjacent vector.

Figure 5:
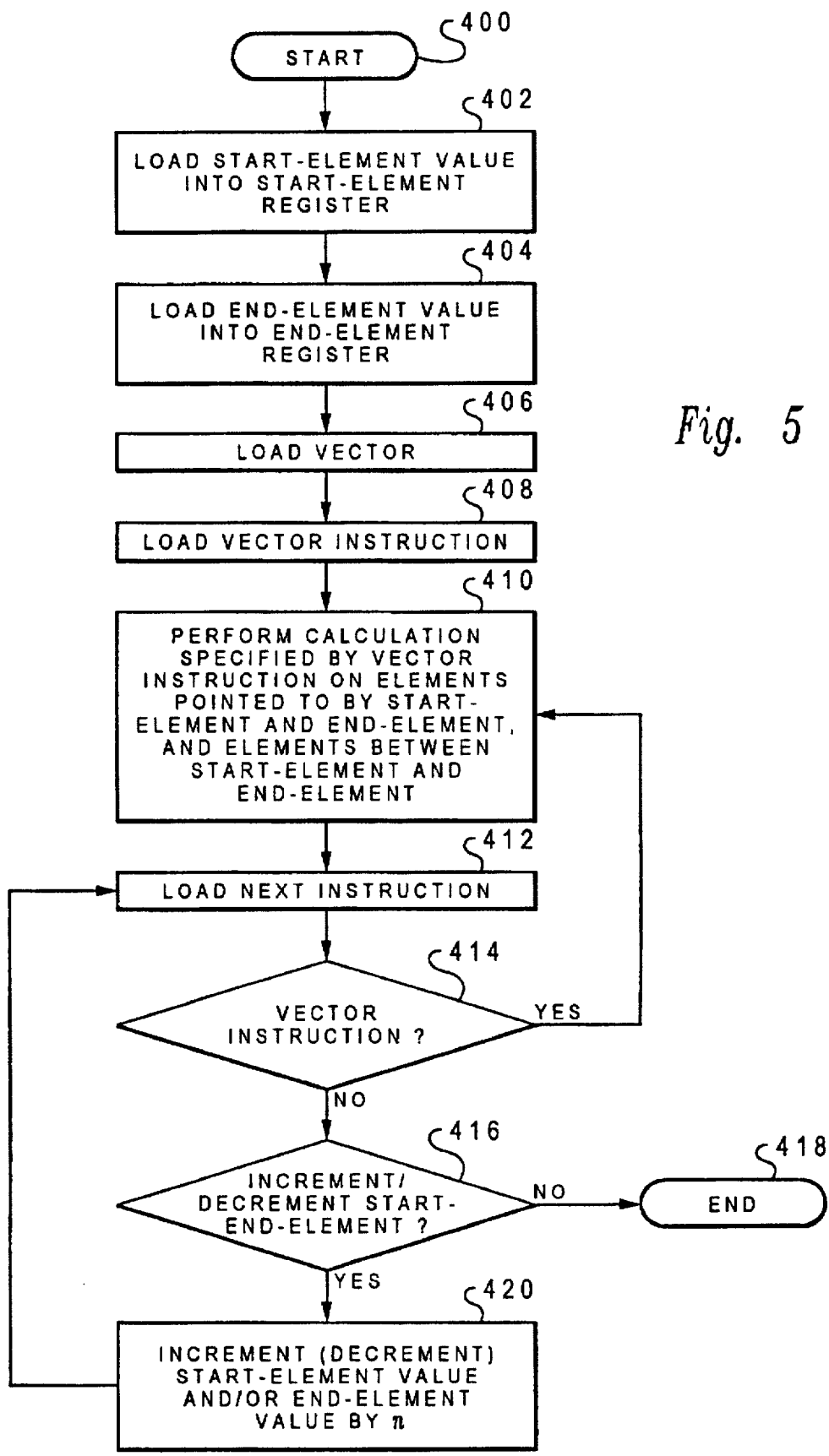
FIG. 5 is a high-level flowchart which illustrates the process of performing a vector processing operation on selected elements of a vector stored in a vector register in accordance with the method and system of the present invention.

Referring now to FIG. 5, there is depicted a high-level flowchart which illustrates the process of performing a vector operation on selected elements of a vector in accordance with the method and system of the present invention. As illustrated, the process begins at block 400 and thereafter passes to block 402. Block 402 illustrates the process of loading a start-element value into the start-element register in the vector processor. Next, the process loads an end-element value in to an end-element register in the vector processor, as depicted at block 404. As illustrated at block 406, the processor then loads a vector into a vector register in the vector processor. Next, the process loads a vector instruction, as depicted at block 408. Such a vector instruction may include an add instruction which directs the arithmetic logic unit to add a specified value to selected elements in the vector register.

As illustrated at block 410, the process then performs the vector calculation specified by the vector instruction on elements pointed to by the start-element value and the end-element value, and the elements between the start-element and the end-element. Thus, the value stored in the start-element register and the end-element register are utilized to select elements from a vector which will be utilized by the arithmetic logic unit to perform a vector operation on such a selected portion of the vector.

The remaining portion of FIG. 5 illustrates how the increment and decrement function may be utilized in a application that executes a series of vector instructions on portions of vectors stored in the vector processor. As depicted at block 412, the process loads the next instruction. After loading this instruction, the process determines whether or not the instruction is a vector instruction at block 414, which directs the ALU to perform a vector operation. If the instruction is a vector instruction, the process passes back to block 410, where the arithmetic logic unit performs the calculation specified by the vector instruction.

If, however, the instruction is not a vector instruction, the process determines whether or not the instruction is a increment or decrement instruction at block 416, which is utilized to increment or decrement either or both the start-element register or end-element register. If the instruction is not an increment or decrement instruction, the process ends, as depicted at block 418. If the instruction is an increment or decrement instruction, the process increments or decrements the start-element value and/or the end-element value by a number, n at block 420. By incrementing or decrementing a value stored in either the start-element register or the end-element register, the number of elements selected from a vector is changed, and the next instruction loaded at block 412 may execute a subsequent vector instruction utilizing a different number of elements selected from a vector.

While the process of selecting elements from a vector to be used in a vector calculation has been described above with reference to a superscalar data processing system having an SIMD execution unit, those persons skilled in the art should recognize that other processing systems having a much less complex design may also benefit from the method and system disclosed herein. Thus, virtually any vector processor may utilize the present invention to select a group of elements from a vector to be used in a vector calculation.

Persons skilled in the art should also recognize that the present invention enables a vector processing application to select a group of elements in a vector, where such a group of elements may lie anywhere in the vector. Prior art systems typically allow the selection of a vector length which may be utilized to select elements form element 0 to element n. The present invention allows an application to select elements from element 0 to element n, elements from element n to the last element, or element from element n to element n'.

While the invention has been particularly shown and described with reference to a preferred embodiment, it will be understood by those skilled in the art that various changes in form and detail may be made therein without departing from the spirit and scope of the invention.

What is claimed is:

1. A vector processing system for performing vector calculations utilizing a portion of a vector, said vector processing system comprising:
   means for receiving a vector comprised of a plurality of vector elements;
   means for receiving a vector processing command;
   means for receiving a start-element value and an end-element value; and
   execution resources for executing said vector processing command, said execution resources being coupled to said means for receiving said vector, said means for receiving said vector processing command, and said means for receiving said start-element value and said end-element value, wherein said execution resources include means for executing said vector processing command utilizing only a subset of said plurality of vector elements selected by said start-element value and said end-element value.

2. The vector processing system of claim 1, and further comprising:

means for incrementing and decrementing said start-element value and said end-element value.

3. The vector processing system of claim 2, wherein execution of said vector processing command includes processing only a first subset of vector elements among a plurality of vector elements within a first vector and processing only a second subset of vector elements among a plurality of vector elements within a second vector, wherein said means for incrementing and decrementing comprises means for incrementing or decrementing at least one of said start-element value and said end-element value such that said first subset of vector elements and said second subset of vector elements include different numbers of vector elements.

4. The vector processing system of claim 1, wherein processing resources include:

a plurality of processing elements, wherein each of said plurality of processing elements is capable of processing one or more of said plurality of vector elements, and wherein each processing element contains an arithmetic logic unit;

a plurality of registers within each of said processing elements for storing said subset of said plurality of vector elements; and a controller coupled to each of said plurality of processing elements, wherein said controller includes means for dispatching commands to selected processing elements for processing selected vector elements in said subset in response to said start-element value and said end-element value.

5. A vector processing system for performing vector calculations utilizing a portion of a vector that is comprised of a plurality of elements, said vector processing system comprising:

a control unit including means for generating processing element commands in response to receipt of a vector instruction and means for receiving and storing a start-element value and an end-element value;

a plurality of processing elements coupled to said control unit for receiving said processing element commands, wherein each of said plurality of processing elements includes an arithmetic logic unit and a plurality of registers;

a vector register for storing said vector, wherein said vector register is comprised of at least one register within each of said plurality of processing elements; and means within said control unit for dispatching said processing element commands to selected processing elements in response to said start-element value and said end-element value, wherein a subset of said plurality of elements within said vector are processed in response to said vector instruction.

6. The vector processing system of claim 5, wherein said vector is a first vector and said subset is a first subset, wherein said control unit includes means for incrementing and decrementing at least one of said start-element value and said end-element value such that a second subset of vector elements among a plurality of vector elements within a second vector processed in response to said vector instruction includes a different number of vector elements than said first subset.

7. The method of claim 6, wherein said vector calculation is performed on said first vector and said second vector in response to a single vector instruction.

8. A method in a vector processing system for performing vector calculations utilizing a portion of a vector, said method comprising the steps of:

storing a vector having a plurality of vector elements in a vector register;

specifying a start element and an end element in said vector; and performing a vector calculation on a subset of said plurality of vector elements in said vector, wherein said subset of said plurality of vector elements includes said start element, said end element, and vector elements between said start element and said end element.

9. The method of claim 8, wherein said step of specifying a start element in said vector includes storing a start-element value in a start-element register, and wherein said step of specifying an end element in said vector includes storing an end-element value in an end-element register.

10. The method of claim 8, wherein said vector is a first vector and said subset is a first subset, said method further comprising the step of repeating said storing, specifying, and performing steps for a second vector including a second subset of vector elements, wherein said first subset and said second subset include different numbers of vector elements.

* * * * *